United States Patent [19]
Schuster et al.

[11] 3,723,541
[45] Mar. 27, 1973

[54] MANUFACTURE OF TRIMETHYL HYDROQUINONE

[75] Inventors: Ludwig Schuster; Rudolf Oster, both of Ludwigshafen, Germany

[73] Assignee: Badische Anilin- & Soda-Fabrik Aktiengesellschaft, Ludwigshafen/Rhein, Land Rheinland-Pfalz, Germany

[22] Filed: Aug. 5, 1970

[21] Appl. No.: 61,492

[52] U.S. Cl. .............................................. 260/621 H
[51] Int. Cl. ............................................... C07c 39/08
[58] Field of Search ................................... 260/621 H

[56] References Cited

UNITED STATES PATENTS

| | | | |
|---|---|---|---|
| 2,229,573 | 1/1941 | Jung | 260/621 H |
| 2,259,936 | 10/1941 | Jung | 260/621 H |

*Primary Examiner*—Howard T. Mars
*Attorney*—Johnston, Root, O'Keefe, Keil, Thompson and Shurtleff

[57] ABSTRACT

A catalytic process for the manufacture of trimethyl hydroquinone by reducing trimethyl p-quinone with hydrogen in the presence of an aliphatic alcohol of from three to five carbon atoms as solvent at temperatures ranging from 60° to 180°C.

4 Claims, No Drawings

MANUFACTURE OF TRIMETHYL HYDROQUINONE

This invention relates to a process for the manufacture of trimethyl hydroquinone by reducing trimethyl p-quinone with hydrogen in the presence of an aliphatic alcohol at elevated temperature.

U.S. Pat. No. 2,229,573 discloses a method of hydrogenating trimethyl p-quinone to trimethyl hydroquinone catalytically in the presence of an organic solvent, and U.S. Pat. No. 2,259,936 describes a similar method of reducing tetramethyl quinone. Both of these patents teach the preferred use of room temperature. The solvents mentioned are toluene alcohol, ether, glacial acetic acid, dilute acetic acid and alcohol, apparently ethanol to judge from the specification. The one and only Example of the first-named specification describes a reaction at room temperature and in alcohol (ethanol). When this reaction is carried out in ethanol or methanol, the products are impure and discolored. In particular, in apparatus of alloy steel, iron and steels containing nickel or chromium detectable amounts of these materials are dissolved in the reaction mixture. Such traces of these heavy metals are exceptionally strong catalysts for the oxidation of trimethyl hydroquinone. The resulting black-colored quinhydrone causes a dark discoloration in the product even when present in traces and spoils it for further use in a number of syntheses, for example for the manufacture of α-tocopherol.

If, on the other hand, higher alcohols, for example alcohols of more than six carbon atoms, non-polar solvents such as aromatic hydrocarbons, for example toluene, or the other solvents mentioned in the cited specifications are used, the product resulting from the hydrogenation separates out. The precipitate encrusts the catalyst and makes it ineffective right from the start of the hydrogenation reaction. The use of higher alcohols is also subject to the limitation that they are very difficult to remove from the product.

It is an object of the invention to provide a process enabling trimethyl hydroquinone to be manufactured in a particularly economic manner, that is, simply and in good yields.

Another object of the invention is to provide a process for manufacturing trimethyl hydroquinone in a degree of purity enabling it to be used without expensive purifying operations.

It is yet another object of the invention to provide a process which enables the reaction product to be readily separated from the reaction mixture.

These objects are achieved in a process for the manufacture of trimethyl hydroquinone by reducing trimethyl p-quinone with hydrogen in the presence of a hydrogenation catalyst and an organic solvent, wherein aliphatic alcohols of from three to five carbon atoms are used as solvents and the reduction is carried out at a temperature of from 60° to 180°C.

The reaction may be represented by the following equation:

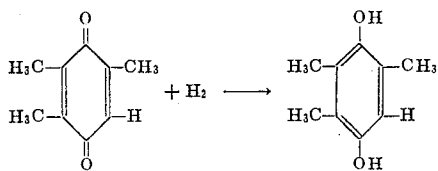

Compared with the known processes the process of the invention produces trimethyl hydroquinone economically, in good yield and in particularly good purity. Even on an industrial scale the product is obtained without substantial autoxidation or discoloration and is therefore suitable for those syntheses which demand high purity of the starting materials. The activity and life of the catalyst are extended. The ready separation of the product from the reaction mixture and its impurities improves the economics of the process. These favorable results are surprising in the light of the prior art.

The starting material may be reacted with hydrogen in stoichiometric amounts, or conveniently, with an excess of hydrogen, for example in molar ratios of trimethyl p-quinone to hydrogen of from 1:1 to 1:20.

All known hydrogenation catalysts including noble and base metal catalysts may be used. We prefer to use Raney nickel, Raney cobalt, Raney copper; platinum oxide; sintered catalysts of cobalt or nickel, which may contain up to 30 percent by weight of copper, manganese, iron and/or chromium; palladium black, palladium on charcoal, platinum on charcoal, platinum sponge, platinum black; and ruthenium, rhodium and rhenium catalysts. If desired, catalysts supported on carrier materials such as pumice, alumina, silica gel and silicic acid may be used. The catalyst is generally used in an amount of from 0.1 to 0.5 percent by weight of the weight of trimethyl p-quinone used. Where supported catalysts are used, it is preferred to use the catalyst in an amount of from 1 to 5 percent by weight of the weight of the carrier material. For further particulars on hydrogenation catalysts, their manufacture and use, reference is made to Ullmanns Encyklopadie der technischen Chemie, Vol. 9, pp. 254 ff. and Vol. 14, pp. 640 ff.

The reaction is carried out at a temperature of from 60° to 180°C, preferably from 60° to 120°C and more preferably from 80° to 100°C, continuously or batchwise. The hydrogenation may be effected at atmospheric pressure or at elevated pressures. Elevated pressures are convenient when the reaction temperature is above the boiling point of the solvent in the reaction mixture. The elevated pressure may be adjusted by the hydrogen alone or mixed with gases which are inert under the reaction conditions, such as nitrogen.

The solvents used in the hydrogenation are aliphatic alcohols of from three to five carbon atoms. Preferred solvents are branched alkanols, although straight-chained alkanols may also be used. Thus suitable alcohols are: n-propanol, n-butanol, n-amyl alcohol, corresponding secondary or tertiary alcohols and preferably isopropyl, isobutyl, t-butyl and isoamyl alcohols. It will be appreciated that mixtures of the said alcohols may be used if desired. The alcohols are generally used in an amount of from six to 10 moles for each mole of trimethyl p-quinone.

The hydrogenation may be carried out as follows: A mixture of the starting material, catalyst and alcohol is hydrogenated in a reactor for from 0.5 to 4 hours with thorough stirring at the reaction temperature. The reaction may be effected continuously in a similar manner using, for example, reaction tubes or cascades. The reaction mixture is then filtered and cooled, and the product precipitates in a very pure, white form resistant to air. The product is filtered off and dried.

Conveniently, the filtrate (the mother liquor of the product) is re-used as the reaction medium in a further hydrogenation operation. This cycle may be repeated a number of times, it being merely necessary to replenish the alcohol lost each time during filtration. This preferred embodiment of the process of the invention is particularly economical due to the saving of solvent.

The trimethyl hydroquinone produced by the process according to the present invention is a valuable intermediate in the manufacture of vitamin E.

In the following examples the parts are by weight unless otherwise stated. The parts by weight relate to the parts by volume as the kilogram to the liter.

EXAMPLE 1

Manufacture of catalyst

Silica gel of particle size 0.06 to 0.3 mm is treated for 30 minutes at 60°C in aqueous suspension with the aqueous solution of an appropriate amount of palladium chloride. The palladium is then precipitated as metal on to the carrier material by the addition of an excess of formaldehyde. The catalyst is washed free of electrolyte and dried at 120°C.

Hydrogenation procedure

A solution of 45 parts of trimethyl p-quinone in 150 parts by volume of isobutyl alcohol is hydrogenated in a stirred vessel equipped with a high-speed stirrer of refined steel with 6,700 parts by volume of hydrogen in the presence of 3 parts of a palladium-on-silicic acid catalyst (0.5 percent w/w palladium). The temperature is held at 80°C. After the theoretical amount of hydrogen has been taken up the solution, which was initially dark in color, becomes light-colored and the absorption of gas stops completely. The reaction mixture is decanted from the catalyst, cooled and filtered to give the precipitated crystalline solid as residue. This is dried in vacuo and gives 33 parts of trimethyl hydroquinone, m.p. 170°C.

The reaction is repeated, 130 parts by volume of the mother liquor from the previous reaction and 20 parts by volume of isobutyl alcohol being used. This produces 39 parts of trimethyl hydroquinone, m.p. 170°C.

This cycle is repeated a further nine times. A total of 495 parts of trimethyl hydroquinone is obtained, the mother liquor following the tenth repetition being evaporated to dryness. This corresponds to a yield of 98.8 percent of the theory.

EXAMPLE 2

In a series of experiments using the following different alcohols (105 parts each time): n-propanol, isopropyl alcohol, n-butanol, isobutyl alcohol, t-butyl alcohol, n-amyl alcohol and isoamyl alcohol, trimethyl p-quinone (45 parts each time) is hydrogenated in the presence of the palladium catalyst as used in Example 1 (3 parts each time) at 90°C following the procedure of Example 1, and the product is isolated. Trimethyl hydroquinone is obtained in the following yields:

24.6 parts using propanol,
21.0 parts using isopropyl alcohol,
28.4 parts using butanol,
35.0 parts using isobutyl alcohol,
27.0 parts using t-butyl alcohol,
29.2 parts using n-amyl alcohol,
35.4 parts using isoamyl alcohol.

In all cases the melting point of the product is in the range 169° to 170°C. The color of the product varies from colorless to yellow in the following order:

t-butyl alcohol
isobutyl alcohol
isopropyl alcohol
isoamyl alcohol
n-amyl alcohol
n-butanol
n-propanol.

The color of the hydrogenation solution also increases in the same order, as does the tendency to autoxidation. However, the color of the product and that of the hydrogenation liquor is much lighter and the autoxidation is substantially less than when the hydrogenation is carried out in ethanol or methanol.

Reaction mixtures comprising the following solvents containing 5.6 percent by weight of trimethyl hydroquinone are left to stand for 4 hours. The iodine color value is then determined according to German Standard Specification DIN 6162. The following results are obtained:

| Solvent | Iodine color value |
|---|---|
| methanol | 50 |
| ethanol | 75 |
| n-propanol | 35 |
| isopropyl alcohol | 5 |
| n-butanol | 5 |
| isobutyl alcohol | 3.5 |
| t-butyl alcohol | 2 |
| n-amyl alcohol | 20 |
| isoamyl alcohol | 7 |

This test shows that breached aliphatic alcohols of from three to five carbon atoms give particularly favorable results.

We claim:

1. In a process for the production of trimethyl-hydroquinone by reducing trimethyl-p-quinone with hydrogen in the presence of a hydrogenation catalyst and a solvent the improvement which comprises using an alkanol having four carbon atoms as the solvent and carrying out the reduction at temperatures between 60° and 180°C and using as the hydrogenation catalyst palladium on a silicic acid support.

2. A process as claimed in claim 1 wherein said solvent is isobutyl alcohol.

3. A process as claimed in claim 1 wherein said solvent is t-butyl alcohol.

4. A process as claimed in claim 1 wherein said solvent is n-butanol.

* * * * *